Nov. 4, 1969  
C. F. BURNEY  
3,476,947  
OPTICAL INTRUSION DETECTION SYSTEM USING  
DUAL BEAM PERIPHERAL SCANNING  
Filed Feb. 19, 1968  
4 Sheets-Sheet 1

INVENTOR.  
CHARLES F. BURNEY  
BY John F. Lawler  
ATTORNEY

INVENTOR.
CHARLES F. BURNEY

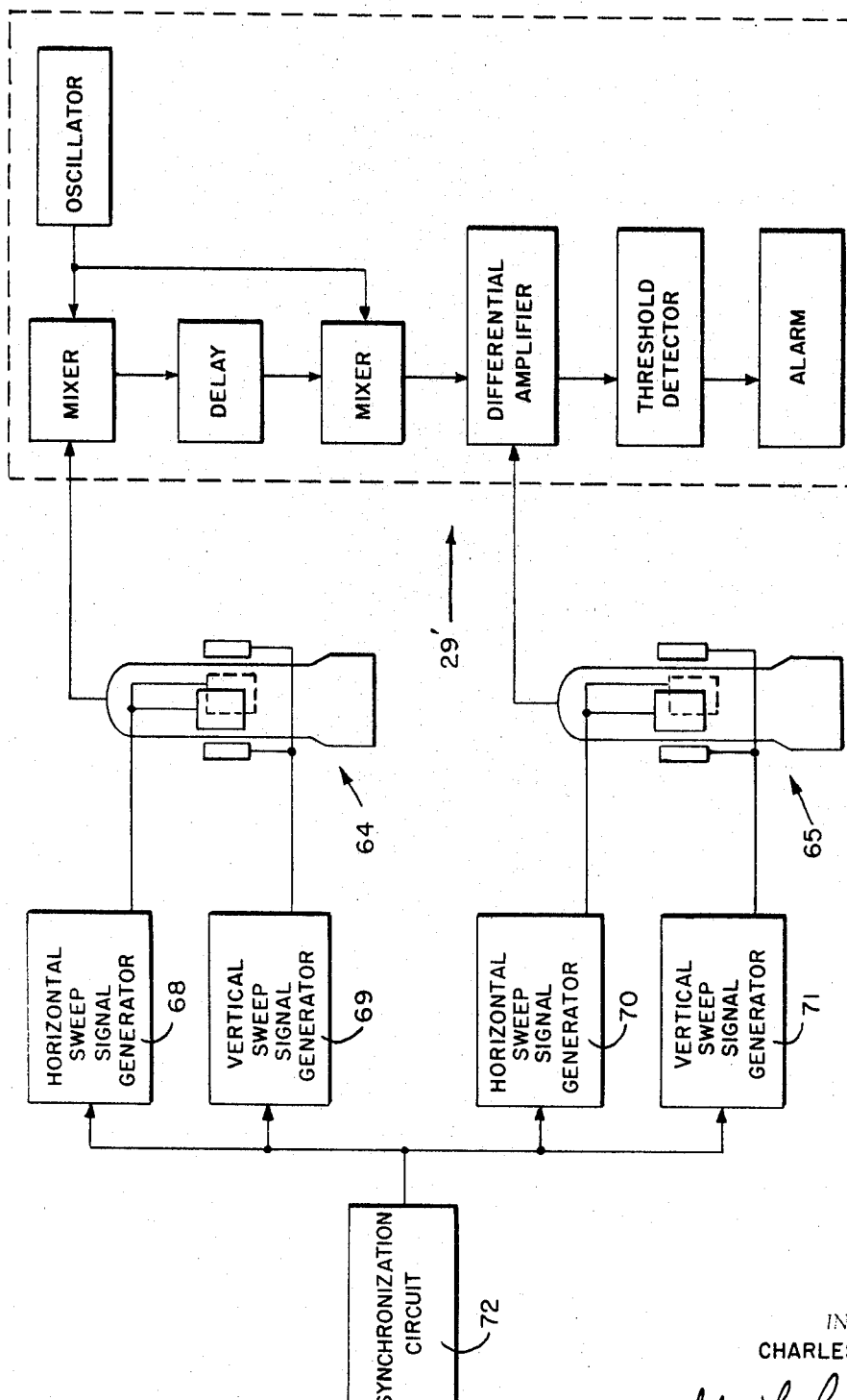

3,476,947
OPTICAL INTRUSION DETECTION SYSTEM USING DUAL BEAM PERIPHERAL SCANNING
Charles F. Burney, Milpitas, Calif., assignor to Sylvania Electric Products Inc., a corporation of Delaware
Filed Feb. 19, 1968, Ser. No. 706,277
Int. Cl. G01n 21/32
U.S. Cl. 250—224                                9 Claims

ABSTRACT OF THE DISCLOSURE

A band on the perimeter of an illuminated surface bounding a protected area is scanned by two rapidly rotating tubes which direct light from the band on photocells. The tubes are mounted on the ceiling to point at two spaced spots or areas on the floor and when rotated about a vertical axis simultaneously scan the circular band on the floor and describe a cone of protection within the room. The intensity of light received by each tube is sensed by the associated photocell. The output of the cell receiving light from the leading tube is delayed and is compared with the output of the photocell aligned with the trailing tube and any change in the output of one cell relative to the other triggers an alarm. The delay period is determined by the physical spacing of the two spots on the floor and the angular velocity of the tubes.

A second embodiment of the invention utilizes two vidicons oriented to face the protected area. The electron beams of the vidicons scan the perimeters of the protected area images on the screens and are synchronized to trace the boundary at the same speed and with one beam trailing the other by a predetermined fixed spacing. The outputs of the vidicons are compared with each other after the signal from the leading beam is delayed for a period equal to the time spacing between the beams and an alarm is sounded if the output of one vidicon changes relative to the other.

Background of the invention

This invention relates to intrusion detection systems and more particularly to an optical system for determining intrusion into a room or the like.

Protection of a room by an optical system of the type described in Patent No. 3,191,048 generally depends upon the reaction of sensors to relative changes in light intensity in an entire room. While such sensitivity is advantageous for complete volumetric protection, it likewise limits the capability of the system to discriminate against normal light variations in a windowed room caused by sweeping automobile headlights, cloud masking of sunlight or moonlight, and the like. This false alarm problem generally limits the use of such a volumetric intrusion detection system to enclosures having controlled or predictable light environments such as windowless rooms.

An object of this invention is the provision of an optical intrusion detection system which has the detection capability of a modified volumetric system and the discrimination (low false alarm) capability of a narrow optical beam system.

The use of a scanning pencil beam in an optical detection system has been suggested in Patent No. 3,120,654 as a technique for protecting a large area. Such a system requires the installation of many reflectors opposite the transmitter-receiver station which not only limit the application and increase cost but complicate camouflage of the system. Furthermore, the spaces between reflectors are unprotected and to that extent the area under surveillance is vulnerable to penetration.

Another object is the provision of an optical system which provides substantially complete floor to ceiling perimeter protection of a room.

Still another object is the provision of a scanning optical receiver in the form of a lighting fixture.

Summary of the invention

An optical receiver has two photosensitive sensors receiving light from two separate small-area spots, respectively, on a remote surface of the lighted room to be protected. The focal axes of these sensors are synchronized to move rapidly and simultaneously around the perimeter of the room while a fixed spacing is maintained between the two viewed spots. The output from the leading spot sensor is delayed sufficiently to coincide with the output of the trailing spot sensor for light from the same spot and a continuous comparison of these delayed and undelayed outputs is made. If light intensity on one sensor changes relative to that on the other sensor, an alarm circuit is energized. The system thus achieves a high signal to noise ratio while providing essentially volumetric protection with apparatus having the appearance of a lighting fixture.

Description of the drawings

FIGURE 5 is a schematic and block diagram of a modified form of the invention having vidicon sensors.

Description of preferred embodiment

Figure 1:
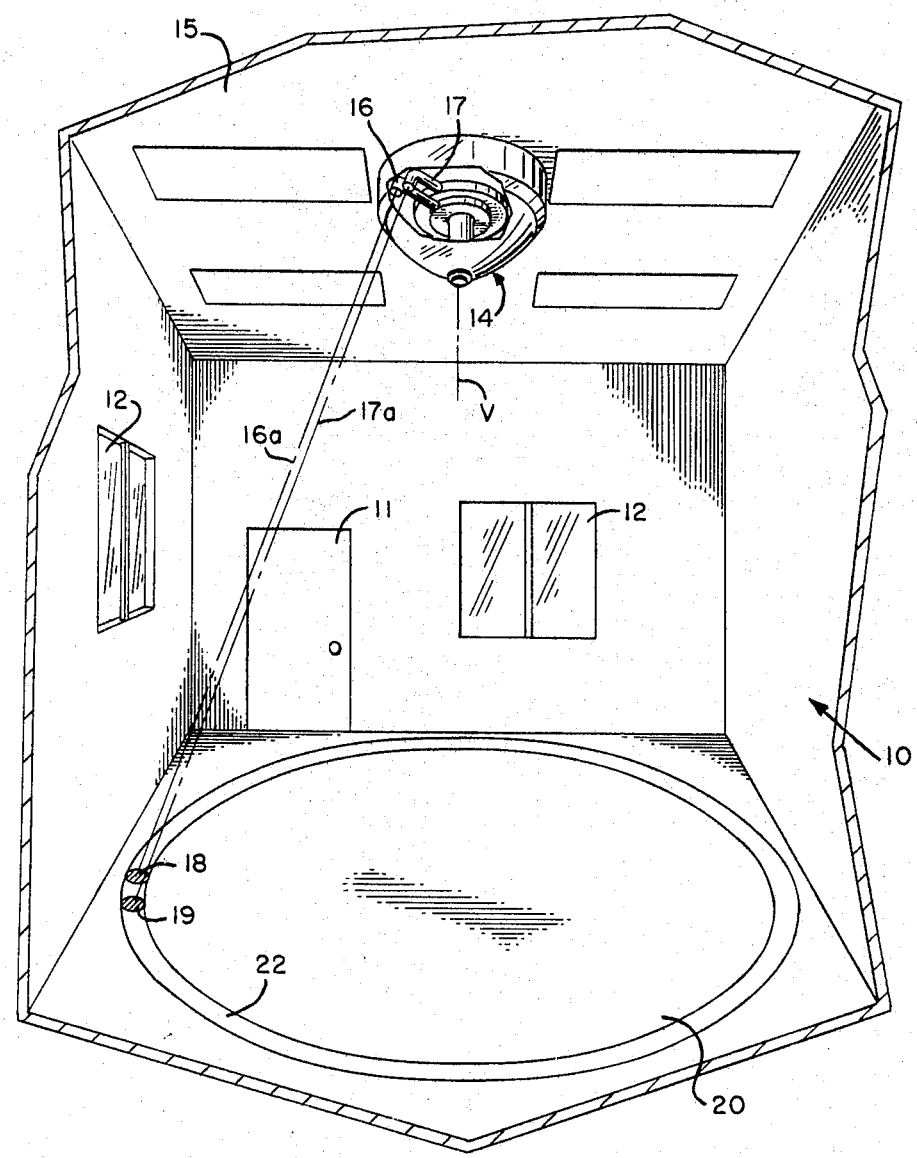
FIGURE 1 is a perspective view of a room partially broken away and showing an intrusion detection apparatus embodying this invention.

Referring now to the drawings, FIGURE 1 shows a room 10 having a door 11 and windows 12 through which access to the room may be had. Intrusion detection apparatus 14 is mounted on the ceiling 15 in the manner of a light fixture and has optical tubes 16 and 17 viewing spots or sections 18 and 19, respectively, of floor 20. The axes of tubes 16 and 17 are designated by the broken lines 16a and 17a.

The detection apparatus 14 preferably is located in the center of the ceiling 15 with tubes 16 and 17 supported for rotation about a vertical axis V. The tubes are mounted with their axes 16a and 17a diverging downwardly and outwardly from axis V and when rotated cause these tube axes to describe an imaginary cone which intersects the floor along the perimeter of the protected area. The column of light received by each of the tubes 16 and 17 therefore emanates from a circular band 22 on the floor. This cone is the boundary of protection for the room, that is, any change in intensity of light within the field of view of one of the tubes 16 and 17 relative to the other causes the system to alarm. Change in light intensity outside the fields of view of the tubes has no discernible effect on the system which therefore discriminates against spurious light reflections. If an intruder enters through door 11 and either directly penetrates the imaginary cone or otherwise causes a change in light reflected from band 22 into the tubes 16 and 17, this condition is detected by the associated photosensitive detectors and an alarm, such as a bell, flashing light or other device, not shown, is given.

Figure 2:
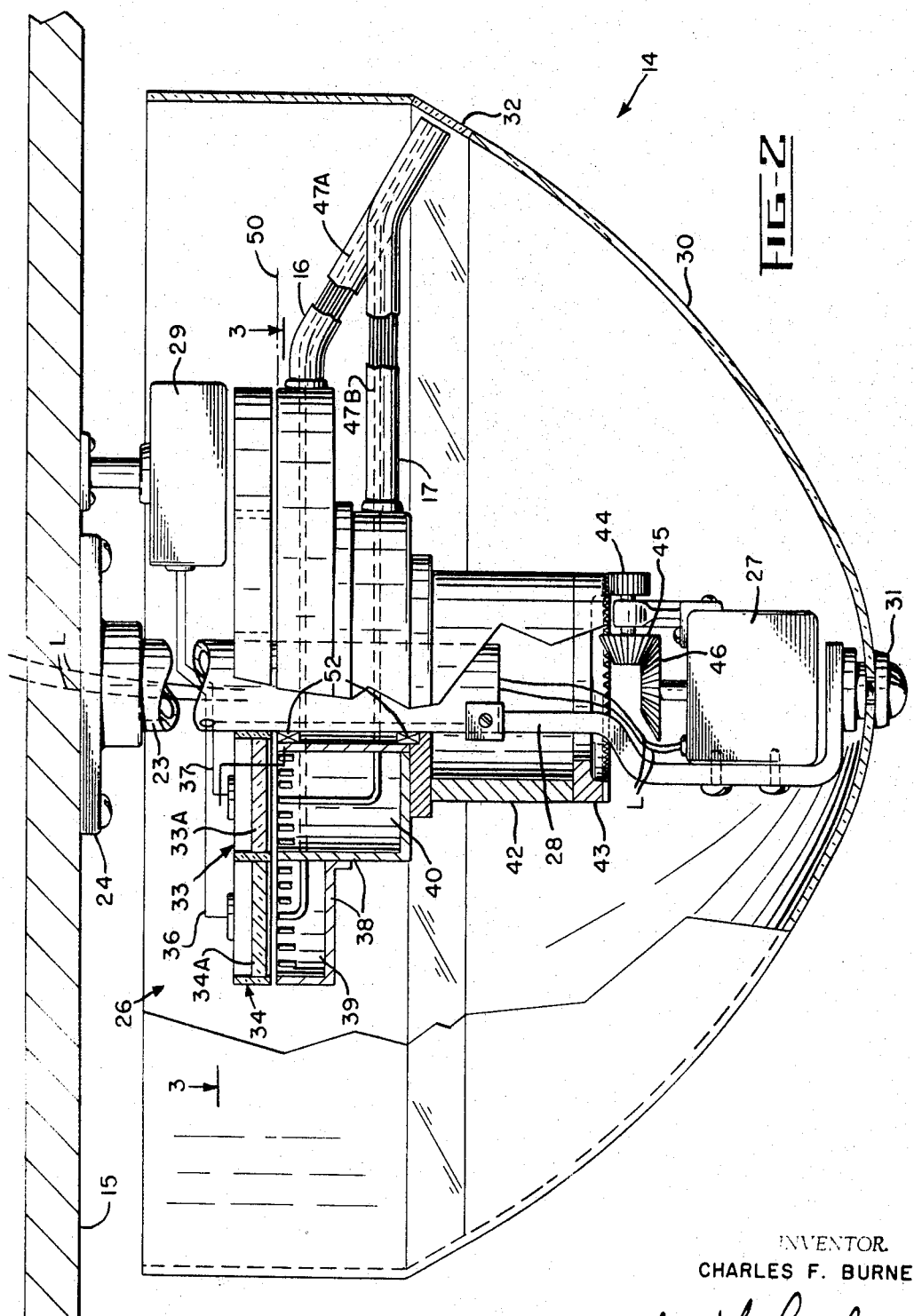
FIGURE 2 is a side elevation partially broken away, of detector assembly embodying this invention.
Figure 3:
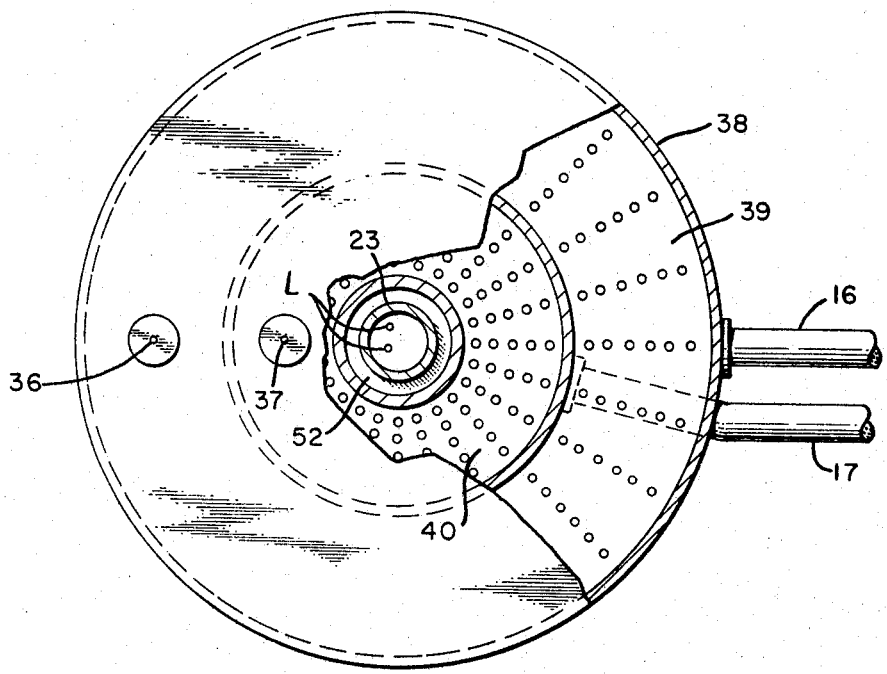
FIGURE 3 is a transverse section taken on line 3—3 of FIGURE 2.

Apparatus 14 is shown in detail in FIGURE 2 and comprises a tubular column 23 mounted by flange 24 to the ceiling of the room to be protected. A detector assembly 26 is coaxially mounted on column 23 and a motor 27, which may be a synchronous clock motor, is supported by bracket 28 on the lower end of the column to drive a portion of the detector assembly 26 as described below. Signal processing circuitry 29 may also be mounted on the ceiling 15 adjacent to the detector assembly 26 or may be located remote from this unit if desired. A globe-like cover 30 is attached by connector 31 to bracket 28 under motor 27 to provide a decorative and protective enclosure for the entire apparatus. This cover may, for example, be an opaque glass with a transparent band 32 to permit light to reach the detector assembly as described below. The apparatus on a ceiling facilitates normal use of the room and its resemblance to a lighting fixture advantageously conceals its true function.

Detector assembly 26 comprises an inner annularly shaped photocell 33 mounted on and fixed to column 23 and an outer annularly shaped photocell 34 mounted coaxially of column 23 on photocell 33. These cells have photosensitive surfaces 33A and 34A and leads 37 and 36, respectively, connecting the outputs of the photocells to signal processor 29.

A housing 38 is rotatably and coaxially mounted on column 23 below photocells 33 and 34 and is divided into annular inner and outer chambers 39 and 40, respectively. Motor 27 rotates housing 38 about column 23 by a drive train comprising tube 42 connected to the housing, a ring gear 43 on the lower end of the tube, and gears 44, 45 and 46 driven by motor 27. Leads L electrically connect motor 27 to a remote power source.

Each of the optical tubes 16 and 17 preferably comprises a bundle of optical fibers 47 capable of conducting light incident on one end of the bundle to the other as is well known in the art. Tube 16 is connected to chamber 39 of housing 38 and the optical fibers 47A therein are configured to extend from the outer ends which are directed toward the floor into chamber 39 and coaxially of column 23 so as to terminate at and in perpendicular relation to a transverse plane 50. Similarly, fibers 47B in tube 17 extend from their floor directed outer ends into housing chamber 40 and terminate at and perpendicular to plane 50. Surfaces 33A and 34A of the photocells preferably are spaced closely to the ends of the fibers 47A and 47B parallel to plane 50 as shown in the drawings.

Housing 38 together with optical tubes 16 and 17 is rotated on bearings 52 about column 23 by drive motor 27. Light received by each of the tubes 16 and 17 form the limited area on floor 20 within the field of view of the tube is transmitted by the optical fibers to the inner ends thereof at plane 50 for illuminating the photosensitive surface of the oppositely disposed photocell. The outputs from the photocells 33 and 34 on leads 37 and 36, respectively, are therefore directly proportional to the intensity of light received by the respective optical tubes.

Figure 4:
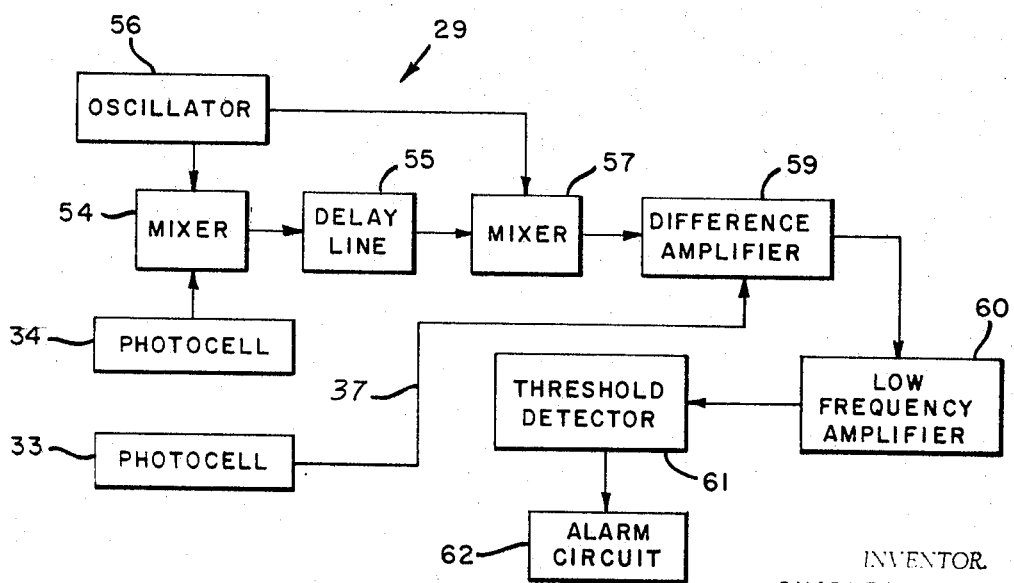
FIGURE 4 is a block diagram showing the signal processing circuits of this system.

The signal processing apparatus 29 comprises a mixer 54, see FIGURE 4, connected to the output of the photocell opposite the leading or front rotating optical tube which, by way of example, is tube 16 associated with photocell 34. The output of mixer 54 is delayed by delay line 55 and is combined with the output of oscillator 56 in a second mixer 57. Oscillator 56 is also connected to mixer 54. The output of the other or "trailing" photocell 33 is fed directly by line 37 to a difference amplifier 59 to which the output of mixer 57 is connected. Amplifier 59 compares the delayed output of photocell 34 with the undelayed output of photocell 33 and produces a Doppler-type output signal if an intruder enters the protected room and changes the light reflected from the same spot on band 22 to the photocells. In the absence of such a change in light, the output of difference amplifier 59 is effectively zero. A low frequency amplifier 60 passes the output of the difference amplifier to a threshold detector 61 which activates an alarm circuit 62 if the predetermined level has been exceeded to indicate an intrusion.

The period or time delay of delay line 55 is related to the angular velocity of tubes 16 and 17 and the spacing of the viewed spots 18 and 19 on the floor such that the outputs of the photocells when receiving light from the same spot are compared in difference amplifier 59. In other words, the period required for the lead cell 34 and trailing cell 33 to traverse the same spot on the floor is substantially the period of the delay line 55. The outputs of the two sensors are thus conditioned for detecting any change in light reflected from the same limited floor area from the time that area is viewed by the lead cell until the trailing cell views it. By way of example, in a system scanning a circular band 22 having a mean radius of 100 feet at an angular velocity of 1800 revolutions per minute and an arucate spacing between viewed spots 18 and 19 of 1 foot would utilize a delay line having a period of 500 microseconds.

In operation, motor 27 is energized by a remote switch and continuously rotates housing 38 so that optical tubes 16 and 17 scan the band 22 on the floor of the protecting room. A conventional lamp or fixture may be used to illuminate the room so that the intensity of light from any spot on band 22 to the phototubes is relatively constant. The entry of an intruder through door 11 or windows 12 changes light detected by scanning tubes 16 and 17 to produce an error signal from difference amplifier 59 and give an alarm. In order to increase spurious signal discrimination capability, the sensitivity of the system may be adjusted to a low level by increasing the threshold of detector 61 so that an alarm is given only by penetration of the protective cone by an intruder. The alarm circuit may be located remotely at a central guard station or may consist of a connection to telephone lines, remote display devices or other monitoring apparatus as may be required or desired.

Apparatus 14 may be energized at a central control station so that motor 27, which may be similar to a clock motor, rotates continuously during the period the room is under surveillance. Alternatively, the apparatus 14 in each room may be energized through the local room light switch so that motor 27 and circuits 29 are operative when the night light for the room is energized.

A modified form of the invention is shown in FIGURE 5 and utilizes the electron beams in vidicons 64 and 65 to scan the perimeter of the protected area. In other words, the screens of the two vidicons may be directed, for example, toward the floor of room 10 from the ceiling. The electron beams of the two vidicons scan the perimeter of the image on the screen at the same velocity and with the same fixed spacing as described above previously for tubes 16 and 17. A difference in light intensity from the same scanned spot on the floor and sensed by one electron beam relative to the other is detected by a signal processor circuit 29' similar to that described above for giving an alarm. The electron beams of the vidicons 64 and 65 are controlled by conventional sweep circuits 68, 69, 70 and 71 which are appropriately synchronized by circuit 72 to control movement of the electron beams as described above.

Changes, modifications and improvements to the above described embodiments of the invention may be made by those skilled in the art without departing from the spirit and scope of the invention. The scanning detection apparatus may be located elsewhere than the ceiling and scan a selected area such as a doorway. The vidicon embodiment of the invention is particularly adaptable to scanning non-circular perimeters, such as rectangles or triangles, through appropriate programming of the beam control circuits. Therefore the appended claims describe the novel features of the invention.

I claim:

1. Apparatus for detecting changes in light on the perimeter of a predetermined area comprising:
    a pair of sensors responsive only to light received at any one instant from two spots, respectively, of a series of spots on said perimeter,
    means for causing said sensors to simultaneously scan at least a portion of said perimeter at the same rate whereby each sensor in succession is responsive to light from the same spot on said perimeter, and a processing circuit connected to the outputs of said sensors, said circuit having means for detecting a change in the output of one of said sensors relative to the other for light received from the same spot on said perimeter, and means responsive to said detected changes for indicating such condition.

2. Apparatus for detecting changes in light on the perimeter of a predetermined area comprising:

a pair of sensors responsive only to light received at any one instant from two spots, respectively, of a series of spots on said perimeter, means for causing said sensors to simultaneously scan at least a portion of said perimeter at the same rate whereby each sensor in succession is responsive to light from the same spot on said perimeter, and a processing circuit connected to the outputs of said sensors, said circuit having means for detecting a change in the output of one of said sensors relative to the other for light received from the same spot on said perimeter, said detecting means comprising means for delaying the output of the first sensor in response to light from a given spot for a period equal to the time from said response of the first sensor until the other sensor responds to light from the same spot, and means for comparing the delayed and undelayed outputs of said sensors, and means responsive to said detected changes for indicating such condition.

3. Apparatus according to claim 2 with a threshold detector responsive to the output of said comparing means and producing an output when the difference between the delayed and undelayed sensor outputs exceeds a predetermined level, and an alarm circuit responsive to the output of said detector for giving an alarm.

4. Apparatus for detecting changes in light on the perimeter of a predetermined area comprising:

a pair of sensors responsive only to light received at any one instant from two spots, respectively, of a series of spots on said perimeter, said sensors comprising:

a pair of photocells having photosensitive surfaces, and means for directing onto said surfaces light received from said spots, respectively, means for causing said sensors to simultaneously scan at least a portion of said perimeter at the same rate whereby each sensor in succession is responsive to light from the same spot on said perimeter, and a processing circuit connected to the outputs of said sensors, said circuit having:

means for detecting a change in the output of one of said sensors relative to the other for light received from the same spot on said perimeter, and means responsive to said detected changes for indicating such condition.

5. The apparatus according to claim 4 in which said directing means comprises two bundles of optical fibers, and means for supporting said bundles for rotation relative to said surfaces.

6. The apparatus according to claim 1 in which said sensors comprise a pair of vidicons having electron beams synchronized to trace the perimeter of said area as viewed by the vidicon screens.

7. Intrusion detection apparatus for a lighted room to be protected comprising a optical receiver mounted on one surface of the room and having two photosensitive sensors directed at any one instant on two separate small-area spots, respectively, on the opposite surface of said room, said receiver also having means for causing the said sensors to simultaneously scan the perimeter of at least part of said opposite surface at the same rate, and means for comparing the output of one of said sensors with that of the other sensor for light received from the same spot on said opposite surface and giving an alarm when a predetermined difference in said sensor output occurs, and a fixture-like cover supported on said surface and enclosing said receiver.

8. Apparatus according to claim 7 in which said one surface of the room is the ceiling and said opposite surface is the floor.

9. Apparatus for detecting intrusion into a lighted room comprising:

an optical receiver assembly supported on the ceiling of the room, and a fixture-like cover supported under and substantially enclosing said receiver assembly whereby to simulate a lighting fixture, said receiver assembly comprising:

a column secured to and projecting vertically downwardly from said ceiling, first and second stationary annular photocells mounted coaxially on said column, said photocells having transverse downwardly facing optically sensitive surfaces, a housing mounted on said column below said photocells for rotation about the axis of said column, said housing having two coaxial chambers vertically aligned with said surfaces, respectively, of the photocells, first and second bundles of optical fibers projecting radially outwardly from said housings, respectively, the fibers in said bundles terminating at one end adjacent the respective surfaces of said photocells and at the other end adjacent said cover in optical alignment with separate spots on the floor of the room, a motor supported on said column below said housing, drive means operatively connecting said motor and said housing whereby said housing is rotated when said motor is energized and said other ends of said optical fiber bundles scan the perimeter of an area of the floor, and a signal processing circuit electrically connected to the outputs of said photocells and comprising:

means for comparing the outputs of said photocells in response to light received by each from the same spot on the floor, and means responsive to the output of said comparing means for giving an alarm when a difference exists between the compared outputs of the photocells.

References Cited

UNITED STATES PATENTS 2,493,543  11/1950  Merchant _____ 340—276 X
3,114,797  12/1963  Williams.
3,336,585  8/1967  Macovski.

RALPH G. NILSON, Primary Examiner

C. M. LEEDOM, Assistant Examiner

U.S. Cl. X.R.

178—6; 340—228, 276